United States Patent [19]

Robbins

[11] 4,201,949
[45] May 6, 1980

[54] PORTABLE GAS LASER AND POWER SUPPLY

[76] Inventor: Gene A. Robbins, P.O. Box 7639, Roswell, N. Mex. 88201

[21] Appl. No.: 819,485

[22] Filed: Jul. 27, 1977

[51] Int. Cl.² .............................................. H01S 3/097
[52] U.S. Cl. ........................ 331/94.5 PE; 331/94.5 D; 315/219; 315/241 R; 315/223; 315/276
[58] Field of Search ................... 331/94.5 P, 94.5 PE, 331/94.5 G, 94.5 D; 330/4.3; 361/313; 315/219, 241 R, 221, 223, 276

[56] References Cited

U.S. PATENT DOCUMENTS

| | | | |
|---|---|---|---|
| 3,275,914 | 9/1966 | Hoffman et al. | 361/313 |
| 3,674,629 | 7/1972 | Roos | 361/313 |
| 3,749,976 | 7/1973 | Colyn | 331/94.5 P |
| 3,812,407 | 5/1974 | Nose et al. | 361/313 |

Primary Examiner—William L. Sikes

[57] ABSTRACT

A laser head uses nitrogen gas to provide output in the far ultraviolet region of radiation. The laser is supplied from an energization system including low voltage and high voltage sections. The low voltage section is supplied from a low d-c voltage, stepped up over a transformer and applied as pulses to a high voltage section, including a voltage doubler circuit. The doubler circuit includes two diode assemblies, and this circuit provides the high voltage pulses for energizing the laser head when a spark gap breaks down. The opposed electrodes of the laser head each have a serrated edge, and the serrated edges face each other to effect a pre-ionization of the gap between the electrodes. A capacitor, coupled across the laser head electrodes, has a particular construction to withstand the repeated, very rapid discharges occasioned for firing the laser, and this capacitor contributes to a laser construction which is truly portable.

4 Claims, 5 Drawing Figures

LOW VOLTAGE SECTION 10 | HIGH VOLTAGE SECTION 12 | LASER HEAD SECTION 13

PORTABLE GAS LASER AND POWER SUPPLY

BACKGROUND OF THE INVENTION

It has been almost two decades since the laser was first suggested, and it has been implemented and used rapidly in the past nineteen years. The term "laser" is an acronym referring to a particular structure for producing radiation, but the acronym is derived from the descriptive term for the method of operation, "light amplification by stimulated emission of radiation". Light from ordinary bulbs and lamps generally is diffuse and scattered. A laser, on the other hand, produces a beam which is in phase with the stimulating radiation, providing bursts of energy at the same frequency to produce a coherent light beam. In spite of the concentrated work done in this field, there is still a need for a compact and inexpensive portable laser arrangement suitable for use in small laboratories and by individual experimenters.

It is, therefore, a primary object of the present invention to provide a compact, inexpensive and simple portable laser arrangement, which does not require energization from a conventional a-c outlet.

Another important object of the invention is to provide such a portable laser which includes an easily operated, low power energization system.

A related object of the invention is the provision of such an energization system which can sustain repeated discharge through the laser head without damaging the power supply components.

Another important object of the invention is to provide such an arrangement in which laser heads, each with a different laseable gas therein, are readily interchangeable to provide radiation at different frequencies.

Another important object of the invention is to provide such a laser arrangement with an energization circuit with minimum impedance, to facilitate production of a high voltage with a fast current rise to effect a highly efficient, reliable discharge in the laser head.

SUMMARY OF THE INVENTION

A laser head and an energization system constructed according to the present invention includes both a low voltage section and a high voltage section in the energization system, and a transformer intercouples the low and high voltage sections. The low voltage section is constructed for energization from a low d-c voltage, such as 12 volts. The high voltage section includes a voltage doubler arrangement, coupled between the secondary winding of the transformer and the laser head. An important aspect of the invention includes the pair of opposed electrodes in the laser head, which are connected for energization from the high voltage section. Each of these electrodes is serrated or notched along one edge surface and the serrated edges are positioned opposite each other. This provides for preionization of the gas in the laser head before the discharge occurs, contributing to the efficiency of the system.

In accordance with another aspect of the invention, the voltage doubler arrangement comprises not two diodes, but two diode assemblies. Each of the diode assemblies comprises a plurality—25 in the preferred embodiment—of diodes connected in series, which are then enclosed in plastic tubing, which is filled with oil and then sealed.

In accordance with an important aspect of the invention, the high voltage capacitor is comprised of two metallic foil sheets separated by a multiplicity of plastic layers, to insure uniform density and thickness of the dielectric material in this capacitor.

THE DRAWING

In the several figures of the drawing, like reference numerals identify like components, and in that drawing:

FIG. 1 is a schematic diagram of a laser head section intercoupled with an energization system according to the invention;

FIGS. 2, 3, and 4 are side, top and end views, respectively, of a laser head constructed for use in the system of this invention; and FIG. 5 is a layout diagram depicting the physical juxtaposition of the different components in the inventive arrangement.

DETAILED DESCRIPTION OF THE INVENTION

Figure 1:
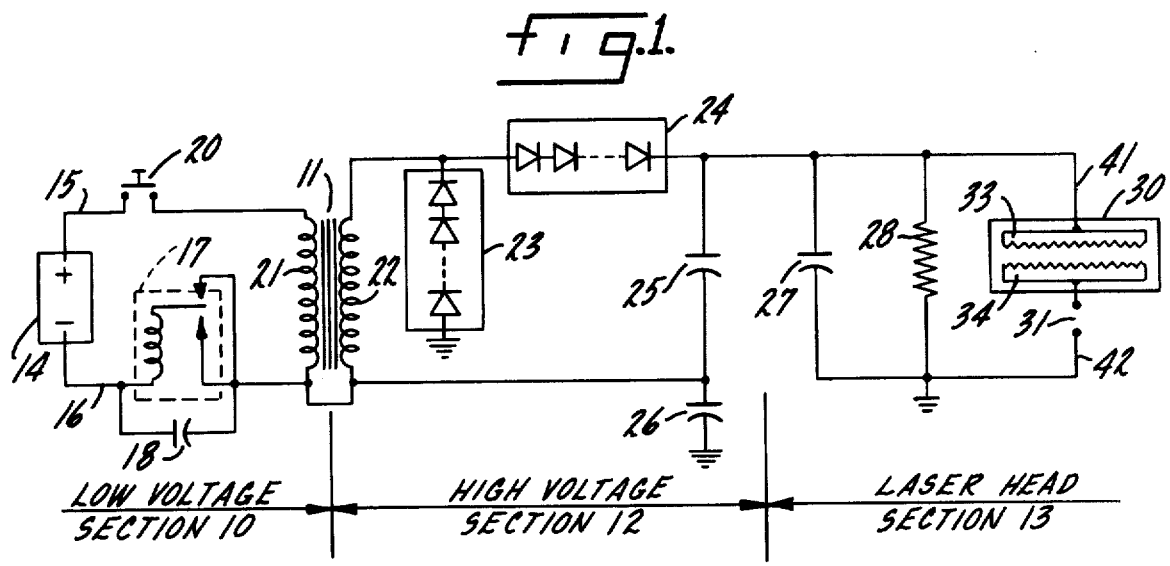

FIG. 1 depicts a laser head and energization system according to the present invention, including a low voltage section 10 coupled over a transformer 11 to a high voltage section 12, which feeds the laser head section 13. The low voltage section 10 includes an input jack 14 for providing a 12 volt d-c voltage on the conductors 15, 16. Switching means 17 can be a simple 12 volt d-c vibrator, of the type conventionally used in auto radios before the advent of transistorized switching circuits to provide a suitable operating potential. A 50 microfarad, 30 volt d-c capacitor 18 bridges the vibrator contacts to minimize the effects of arcing as the contacts repeatedly open and close when the system is operating. A push-button switch 20 completes the energizing circuit for the primary winding 21 of the transformer 11 to produce a high voltage pulse across the secondary winding 22. Transformer 11 can be a 6 volt (automotive type) spark coil.

The high voltage section 12 is basically a voltage doubler circuit, with a first diode assembly 23 and a second diode assembly 24. In a preferred embodiment, each of the diode assemblies was comprised of 25 diodes, such as a type 1N4007, all connected in series, with each assembly of 25 diodes being enclosed in a plastic tube of polyethylene or similar material, which was filled with oil and then sealed. The oil can be of general automotive type, such as 10W30 general purpose oil. The high voltage section was completed by the capacitors 25 and 26 connected as shown. These capacitors are of the type frequently used in the high voltage circuit of a television receiver. That is, each was a 500 micromicrofarad capacitor, rated at 20,000 volts d-c.

Laser head section 13 includes a capacitor 27, a bleeder resistor 28, laser head 30 and a spark gap 31. Particularly important to the invention is the construction of capacitor 27, to sustain the repeated high-voltage discharges. The electrodes or "plates" of capacitor 27 were each comprised of an aluminum foil sheet, 10 inches by 15 inches. The capacitor dielectric was comprised of 12 sheets of 0.0015 inch thick plastic, such as polyethylene, to provide a dielectric thickness of 0.018 inch. The multiple plastic sheets insure uniform density and thickness of the dielectric. The resultant structure of capacitor 27 is wound around a polyvinyl chloride (pvc) plastic tube one and one-half inches in diameter and 12 inches long. Before winding, a cut is made on the side wall, at one end, of the pvc tube; this cut provides a slot which extends from the end of the tube for a length of two inches toward the center. To provide the 12 layers of dielectric material, six layers of 12 inch by 30 inch polyethylene sheet can be provided, and an aluminum foil sheet of 10 inches by 15 inches is laid on one side of the dielectric layers. A strip of aluminum foil, one-half inch by three inches, is laid on the foil so that it extends outwardly of the foil sheet, and the other half (six sheets) of the dielectric material are folded over the foil sheet, so that only the strip extends outwardly from the dielectric "bundle". This strip is positioned through the two-inch slot in the plastic tube, to provide the positive connection in the circuit. The other foil layer, which will provide the negative plate of the capacitor, is taped to the plastic tube diametrically opposite the location at which the slot was made for the positive connection. The foil layer for the negative plate is generally of the same dimensions as the positive plate, but the negative foil plate includes a portion extending approximately one inch beyond the dielectric layers. The bundle of dielectric material is then wound tightly around the plastic tube, with the negative plate extension ending up on the outside, to provide for the circuit connection. The diode assemblies 23, 24 are placed in the same plastic tube. This structure assists in keeping the leads from capacitor 27 as short as possible to the laser head, thus minimizing the inductance (and resultant impedance) in the discharge circuit. Bleeder resistor 28 was a composition unit, of 20 megohms resistance.

Figure 2:
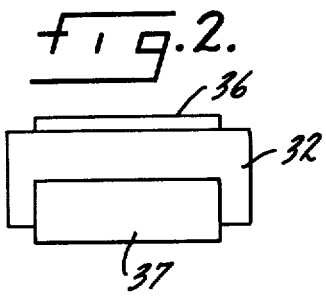
Figure 4:
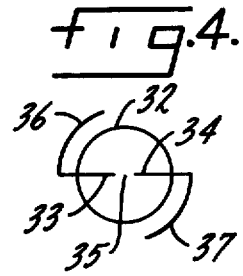
Figure 3:
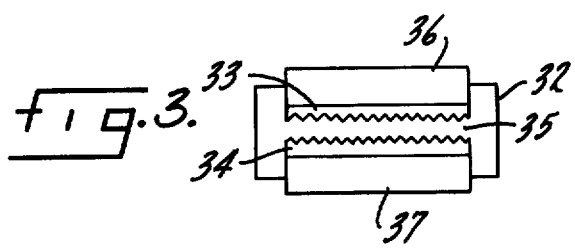

Laser head 30, as shown in FIGS. 2 and 3, has a cylindrical body portion 32 formed of plastic tubing, which may be polyvinyl chloride, one and one/quarter inches in diameter and three inches in length. The head includes a pair of electrodes 33, 34, each of which includes a serrated edge portion positioned opposite the notched edge of the opposed electrode. This is an important aspect of the present invention, as it appears that just prior to the main power transfer between the electrodes, the gas particles in gap 35 are ionized by the multiple filamentary discharges from the serrated edges of the electrodes. This preionization inherently raises the level of the energy in the nitrogen gas. In an embodiment successfully built and tested, a pair of hacksaw blades were used as the electrodes 33, 34. The blade teeth provided the serrations for effective preionization. Each blade was attached to a piece of brass stock 36, 37 of 0.015 inch thickness, 2½ inches wide and 3½ inches long. The output end portion of head 30 was closed by a glass wall portion ⅛ inch thick and 1 ⅛ inch in diameter, and the rear end was closed by a second surface mirror of similar dimensions. Each brass electrode 36, 37 extends about 3 inches from the laser, and each is bent as shown in FIG. 4 to follow the curvature of the laser body, which was about two inches in diameter. The laser head 30 was filled with pure nitrogen, pumped to a pressure of 100 torr, and then sealed with silicone caulk.

Figure 5:
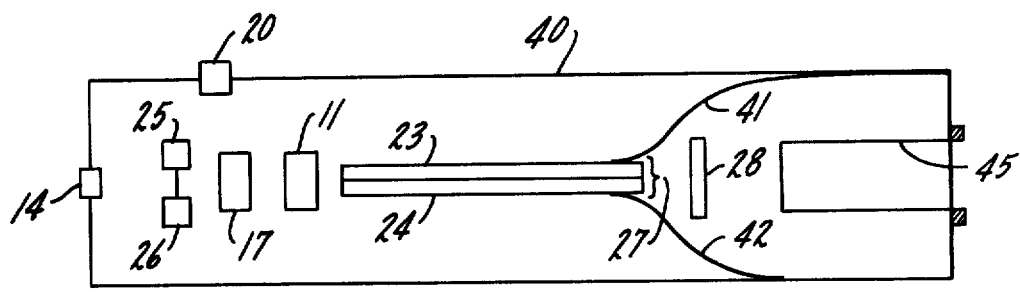

All the laser components were fitted into a tube 40, as shown in FIG. 5, of two inches diameter and 24 inches in length. The laser head was designed to slide snugly into the laser body, with the brass electrodes 36, 37 temporarily deformed into a smaller circle around the head, and a ¼ turn of the head completes the electrical circuit. The brass electrodes attempt to spring back to the larger, original degree of curvature, but are stopped by the inner tube surface 45 (FIG. 5). This causes a very snug fit, by friction alone, of the laser head 30 within tube 45. The positive connection is made over a one inch wide brass strap 41, extending from the positive plate of capacitor 27 to one terminal of the laser head. The outer exposed corner 42 of the negative capacitor plate is positioned about one inch from the opposite electrode of the laser head, thus defining spark gap 31 which breaks down to fire the laser. The gap 35 between the electrodes was five millimeters in the embodiment tested, and it appears this gap may be in the range of 4 to 12 millimeters. The pressure of the nitrogen may vary from 1 to 150 torr.

In operation, a d-c voltage of 12 volts is supplied to conductors 15, 16, and switch 20 is depressed to energize switching means 17. The oscillatory action thus produced in low voltage section 10 provides pulses across secondary winding 22 of about 18 kilovolts, and these pulses are rectified by the voltage doubler circuit 23–26 in the high voltage section, providing a voltage across capacitor 27 that approaches 35 kilovolts when spark gap 31 breaks down and the laser is fired. Capacitor 27 discharges across the spark gap and through the laser head, initiating a super radiant laser discharge in the nitrogen within the head.

TECHNICAL ADVANTAGES

It appears the construction of capacitor 27 is a very significant part of the present invention. By providing multiple layers of dielectric between the foil electrodes, a very uniform total dielectric layer is achieved. This is important for this high voltage capacitor, which must charge to a voltage of about 35 kilovolts, and must discharge to produce a very high current density, of the order of 1,000 amperes per linear centimeter. This capacitor construction has made practical the described assembly of a totally portable laser, with a self-contained power supply which is completely independent of the conventional a-c power mains. At this time there is no other commercially available, totally portable self-contained laser.

Another important advantage of the invention is that, although described in connection with a nitrogen-filled head, the head 30 is easily removed from the portable unit, and another head with a different gas is easily inserted into the tube 45 to provide radiation at a different wavelength. The various noble gases such as nitrogen, neon, argon, helium, xenon and krypton can be incorporated in different head units for use in the layer assembly. This allows individual experimenters, and schools or other groups with limited budgets, a considerable range of laser diversity for a modest, economical investment.

The nitrogen laser described above performs in the far ultraviolet region, exhibiting a highly defined output at approximately 3,371 Angstrom units, at a power of approximately 3 to 5 kilowatts. The output is in the form of a super radiant pulse of coherent frequency, and temporal placement. The power supply described above has fired the laser several times a second, at a potential in the range of 35 to 40 kilovolts, plus or minus 10%. The output developed thus far has been sufficient for photographs, holograms and other studies requiring an extremely short time duration (less than 10 nanoseconds) and coherent light. The reliability of the circuit has proved very high. This appears to be due to the liberal overdesign of the electrical components, including the many diodes in the assemblies 23, 24 and the construction of the capacitor 27. The serrated, opposed edges of the electrodes appear to contribute to the preionization and thus the rapid build up of current to effect a very good discharge in the laser head itself. It is noted that the pulses are of an extremely short time duration and this further reduces the possibility of wear on the various components of the invention.

I claim:

1. A laser head and energization system, including:
   a stepup transformer, having primary and secondary windings;
   a low voltage section, including a pair of input conductors for receiving a d-c input voltage, a switch coupled between one of the input conductors and one side of the primary winding, and a vibrator coupled between the other input conductor and the other side of the primary winding;
   a high voltage section, including a voltage doubler arrangement having first and second diode assemblies coupled to one side of the secondary winding, a first capacitor coupled between the other side of the secondary winding and one of the diode assemblies, and a second capacitor coupled between ground and the common connection between the secondary winding and the first capacitor; and
   a laser head section, including a laser head containing a gas and having as the only electrically conductive members in the laser head a pair of electrodes with opposed, serrated edges to effect pre-ionization of the gas, a pair of conductive members, each attached to one of the electrodes and extending outwardly to provide means for establishing an electrical connection with an adjacent circuit, and a high-voltage capacitor comprising a plastic tube, a pair of foil electrodes and a plurality of dielectric layers between the pair of foil electrodes, which foil electrodes and dielectric layers are wound around the plastic tube to form said high-voltage capacitor, one of said foil electrodes extending to a point adjacent but spaced from one of the conductive members to define a spark gap, and means, including a conducting strip, for establishing an electrical connection between the other foil plate of the high voltage capacitor and the other of the conductive members attached to the electrodes.

2. A system as claimed in claim 1, and in which an additional capacitor is coupled in parallel with the vibrator in the low voltage section.

3. A system as claimed in claim 1, and further comprising a bleeder resistor coupled in parallel with the high voltage capacitor.

4. A system as claimed in claim 1, and further comprising a first plastic tube enclosing one of the diode assemblies, a second plastic tube enclosing the other diode assembly, a liquid dielectric filling the remainder of each of said tubes, and the first and second tubes being inserted into the plastic tube around which the high-voltage capacitor is wound.

* * * * *